(12) United States Patent
Akitt et al.

(10) Patent No.: US 6,972,401 B2
(45) Date of Patent: Dec. 6, 2005

(54) ILLUMINATED BEZEL AND TOUCH SYSTEM INCORPORATING THE SAME

(75) Inventors: Trevor M. Akitt, Calgary (CA); Neil Gordon Bullock, Calgary (CA); Gerald D. Morrison, Calgary (CA)

(73) Assignee: Smart Technologies Inc., (CA)

( * ) Notice: Subject to any disclaimer, the term of this patent is extended or adjusted under 35 U.S.C. 154(b) by 288 days.

(21) Appl. No.: 10/354,168

(22) Filed: Jan. 30, 2003

(65) Prior Publication Data
US 2004/0149892 A1    Aug. 5, 2004

(51) Int. Cl.[7] .......................................... H01J 40/14
(52) U.S. Cl. ....................................... 250/221; 250/216
(58) Field of Search ............................ 250/221, 239, 250/216, 226, 559.29; 345/166, 173, 175

(56) References Cited

U.S. PATENT DOCUMENTS

| | | | | |
|---|---|---|---|---|
| 4,507,557 A | | 3/1985 | Tsikos | 250/341 |
| 4,737,631 A | * | 4/1988 | Sasaki et al. | 250/221 |
| 4,742,221 A | | 5/1988 | Sasaki et al. | 250/221 |
| 4,746,770 A | | 5/1988 | McAvinney | 178/18 |
| 4,818,826 A | | 4/1989 | Kimura | 178/19 |
| 5,317,140 A | | 5/1994 | Dunthorn | 250/221 |
| 5,502,568 A | | 3/1996 | Ogawa et al. | 356/375 |
| 5,936,615 A | | 8/1999 | Waters | 345/173 |
| 6,008,798 A | | 12/1999 | Mato, Jr. et al. | 345/168 |
| 6,100,538 A | | 8/2000 | Ogawa | 250/559.38 |
| 6,208,330 B1 | | 3/2001 | Hasegawa et al. | 345/173 |
| 6,335,724 B1 | | 1/2002 | Takekawa et al. | 345/173 |
| 6,414,671 B1 | | 7/2002 | Gillespie et al. | 345/157 |
| 6,421,042 B1 | | 7/2002 | Omura et al. | 345/157 |
| 6,531,999 B1 | | 3/2003 | Trajkovic | 345/157 |
| 6,563,491 B1 | | 5/2003 | Omura | 345/173 |
| 2001/0019325 A1 | | 9/2001 | Takekawa | 345/157 |
| 2001/0022579 A1 | | 9/2001 | Hirabayashi | 345/175 |
| 2001/0026268 A1 | | 10/2001 | Ito | 345/175 |

FOREIGN PATENT DOCUMENTS

| | | |
|---|---|---|
| DE | 198 10 452 A1 | 12/1998 |
| JP | 57-211637 | 12/1982 |
| JP | 8-240407 | 9/1996 |
| JP | 9-91094 | 4/1997 |
| JP | 9-319501 | 12/1997 |
| WO | WO 99/40562 | 8/1999 |

OTHER PUBLICATIONS

"CCDs in optical touch panels deliver high resolution", Bud K. Funk, Electronic Design, Sep. 27, 1980, pp. 139-143.

\* cited by examiner

Primary Examiner—Que T. Le
(74) Attorney, Agent, or Firm—Katten Muchin Rosenman LLP (57) ABSTRACT

A passive touch system includes a touch surface and at least one source of backlight illumination projecting backlighting across the touch surface. At least two image sensors are associated with the touch surface and acquire images of the touch surface from different locations. A digital signal processor is associated with each image sensor. The digital signal processors select pixel subsets of images acquired by the image sensors and process pixel data acquired by the selected pixel subsets to generate pointer characteristic data when a pointer exists in the acquired images. A master digital signal processor in communication with the digital signal processors triangulates the pointer characteristic data to determine the location of the pointer relative to the touch surface.

69 Claims, 7 Drawing Sheets

ILLUMINATED BEZEL AND TOUCH SYSTEM INCORPORATING THE SAME

FIELD OF THE INVENTION

The present invention relates generally to touch systems and in particular to an illuminated bezel for a touch system and to a touch system incorporating the same.

BACKGROUND OF THE INVENTION

Touch systems are well known in the art and typically include a touch screen having a touch surface on which contacts are made using a pointer. Pointer contacts with the touch surface are detected and are used to generate output pointer position data representing areas of the touch surface where the contacts are made. There are basically two general types or touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of a special pointer in order to activate the touch surface. A passive pointer can be a finger, a cylinder of some material, or any suitable object that can be used to contact some predetermined area of interest on the touch surface. Since special active pointers are not necessary in passive touch systems, battery power levels and/or pointer damage, theft, or pointer misplacement are of no concern to users.

International PCT Application No. PCT/CA01/00980 filed on Jul. 5, 2001 and published under number WO 02/03316 on Jan. 10, 2002, assigned to the assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look along the touch surface. The digital cameras acquire images of the touch surface from different locations and generate image data. The image data is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of the applications programs executed by the computer.

Although this touch system works extremely well, it has been found that when the digital camera frame rates are high, in less favorable light conditions the ability to determine the existence of a pointer in the captured image data is diminished. As a result, there exists a need to improve the lighting environment for the digital cameras to ensure high resolution irrespective of ambient lighting conditions.

The concept of providing an illumination source for a touch surface has been considered. For example, U.S. Pat. No. 4,144,449 to Funk et al. discloses a position detection apparatus for detecting the position of a passive object. The position detection apparatus includes a generally rectangular frame having an open interior. Fluorescent tube continuous light sources extend along three sides of the frame for illuminating the open interior of the frame. Linear image detectors are mounted at opposite corners of the fourth side of the frame. Aperture-defining devices are located between the linear image detectors and the open interior of the frame for configuring coincident fields of light from the open interior for the linear image detectors to view. Unfortunately, the light emitted by fluorescent tubes is limited to a very narrow frequency range within the visible light spectrum. This makes the position detection apparatus very susceptible to interference by ambient light.

It is therefore an object of the present invention to provide a novel illuminated bezel and a touch system incorporating the same.

SUMMARY OF THE INVENTION

According to one aspect of the present invention there is provided in a touch system including a touch surface and at least one optical sensor looking along the touch surface to acquire images of a pointer in proximity thereto, an illumination source to provide backlighting to said at least one optical sensor comprising:

at least one light source; and a diffuser disposed between said at least one light source and said at least one optical sensor, said diffuser diffusing light projected by said at least one light source prior to said light being directed to said at least one optical sensor.

In one embodiment, the at least one light source includes a plurality of spaced discrete light sources. The discrete light sources are arranged in at least one row and are generally equally spaced. The light projected by the discrete light sources onto the diffuser is expanded so that the illumination source appears as a generally continuous illumination source to the at least one optical sensor.

In a preferred embodiment, the diffuser is generally transparent in a specified frequency range and generally opaque in a different specified frequency range. In one embodiment, the discrete light sources are infrared light emitting diodes and the diffuser is generally transparent in the infrared range and generally opaque in the visible range.

In an alternative embodiment, the at least one light source is a continuous light source. The continuous light source may project light in the infrared spectrum or project light in the visible spectrum. When the continuous light source projects light in the visible spectrum, the illumination source further includes a color filter either adjacent to or incorporated into the diffuser.

According to another aspect of the present invention there is provided a touch system comprising:

at least one optical sensor associated with a touch surface and having a field of view encompassing and looking across at least a portion of said touch surface;

at least one source of backlight illumination directing light into the field of view of said at least one optical sensor, said at least one illumination source including at least one light source and a diffusion medium to expand light projected by said at least one light source prior to said light being directed into said field of view; and a pass filter associated with said at least one optical sensor to pass the light directed by said source of backlight illumination to said at least one optical sensor.

According to yet another aspect of the present invention there is provided a passive touch system comprising:

a touch surface;

at least one source of backlight illumination projecting backlighting across said touch surface;

at least two image sensors associated with said touch surface, said at least two image sensors acquiring images of said touch surface from different locations and having overlapping fields of view;

a pass filter associated with each of said image sensors generally to blind said image sensors except to said projected backlighting;

a digital signal processor associated with each image sensor, the digital signal processors associated with said at least two image sensors selecting pixel subsets of images acquired by said at least two image sensors and processing pixel data acquired by the selected pixel subsets to generate pointer characteristic data when a pointer exists in said acquired images; and a master digital signal processor in communication with said digital signal processors, said master digital signal processor receiving pointer characteristic data from said digital signal processors and triangulating the pointer characteristic data to determine the location of said pointer relative to said touch surface.

According to yet another aspect of the present invention there is provided a touch system comprising:

at least two CMOS image sensors associated with a touch surface, said at least two CMOS image sensors acquiring images of said touch surface from different locations and having overlapping fields of view;

at least one source of backlight illumination projecting backlighting across said touch surface;

a pass filter associated with each of said image sensors generally to blind said image sensors except to said projected backlighting; and at least one processor receiving and processing image data acquired by said at least two CMOS image sensors to detect the existence of a pointer in said images and to determine the location of said pointer relative to said touch surface.

According to still yet another aspect of the present invention there is provided a touch system comprising:

at least two optical recording devices associated with a touch surface, said at least two optical recording devices acquiring images of said touch surface from different locations and having overlapping fields of view;

at least one source of backlight illumination projecting backlighting across said touch surface;

a pass filter associated with said optical recording devices generally to blind said optical recording devices except to said projected backlighting; and a processor receiving and processing image data acquired by said at least two optical recording devices to detect the existence of a pointer in said images and to determine the location of said pointer relative to said touch surface, wherein said processor includes first and second processing stages, said first processing stage processing pixel data from said at least two optical recording devices, said second processing stage processing image data from said first processing stage to determine the location of the pointer.

According to still yet another aspect of the present invention there is provided an imaging assembly comprising:

a substantially rectangular bezel to surround a display surface;

at least one optical sensor mounted on said bezel, said at least one optical sensor being oriented to have a field of view looking along said display surface;

at least one source of backlight illumination within said bezel projecting backlight illumination into said field of view; and a pass filter associated with said at least one optical sensor to pass the light directed by said source of backlight illumination to said at least one optical sensor.

According to still yet another aspect of the present invention there is provided a method of detecting the position of a pointer relative to a touch surface comprising the steps of:

acquiring multiple images of a pointer relative to said touch surface;

selecting pixel subsets of said acquired images;

processing pixel data acquired by the pixel subsets to detect the existence of said pointer therein and to determine the location of the pointer relative to the touch surface using triangulation; and during said acquiring providing backlight illumination across said touch surface and acquiring said images based on said backlight illumination.

The present invention provides advantages in that the illuminated bezel provides good backlighting for the optical sensors allowing the optical sensors to detect the presence of a pointer in close proximity to the touch surface in a wide range of ambient lighting conditions. This of course increases the resolution of the touch system.

BRIEF DESCRIPTION OF THE DRAWINGS

Embodiments of the present invention will now be described more fully with reference to the accompanying drawings in which:

FIG. 13b is a front elevation view of a diffuser showing an illumination spot projected thereon by the discrete light source of FIG. 13a;

DETAILED DESCRIPTION OF THE PREFERRED EMBODIMENTS

The present invention relates generally to a touch system including at least one optical sensor having a field of view encompassing a touch surface. At least one source of backlight illumination directs light towards the at least one optical sensor to enable pointer contacts with the touch surface to be clearly detected by the at least one optical sensor in a variety of ambient lighting conditions. Preferred embodiments of the present invention will now be described.

Figure 1:
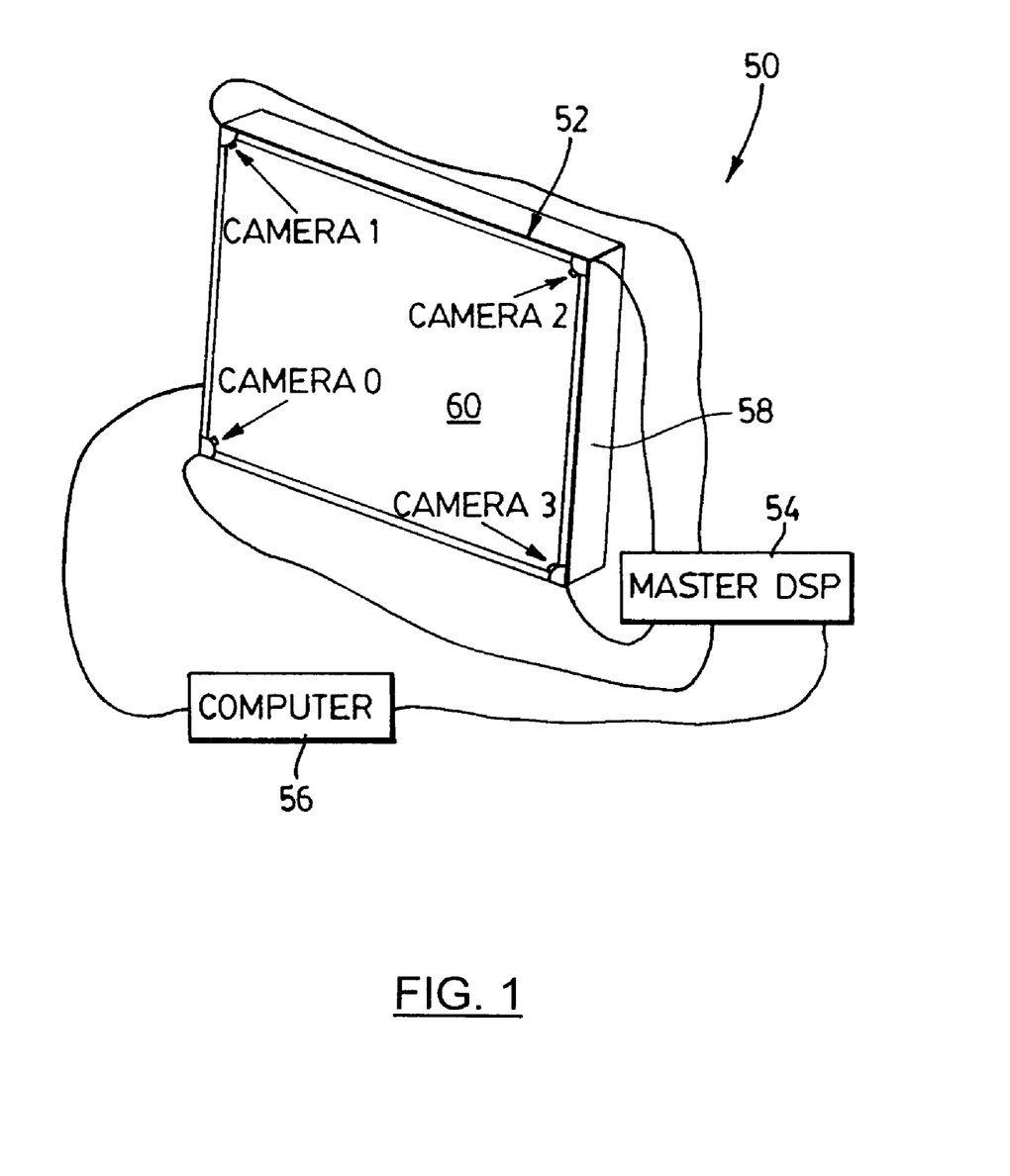
FIG. 1 is a schematic diagram of a camera-based touch system.

Turning now to FIG. 1, a camera-based touch system in accordance with the present invention is shown and is generally identified by reference numeral 50. Camera-based touch system 50 is similar to that disclosed in International PCT Application Serial No. WO 02/03316, assigned to SMART Technologies Inc., assignee of the present invention, the content of which is incorporated herein by reference. As can be seen, touch system 50 includes a touch screen 52 coupled to a digital signal processor (DSP) based master controller 54. Master controller 54 is also coupled to a computer 56. Computer 56 executes one or more application programs and provides computer-generated image output to the touch screen 52. The touch screen 52, master controller 54 and computer 56 form a closed-loop so that pointer contacts with the touch screen 52 can be recorded as writing or drawing or used to control execution of application programs executed by the computer 56.

Figure 2:
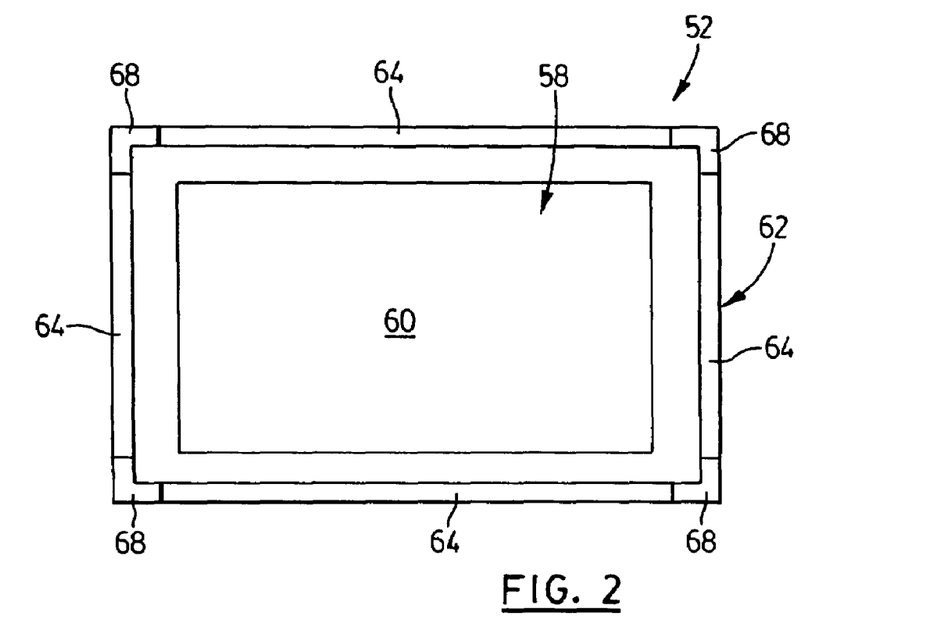
FIG. 2 is a front elevation view of a touch screen forming part of the touch system of FIG. 1 including an illuminated bezel in accordance with the present invention.

FIG. 2 better illustrates the touch screen 52. Touch screen 52 in the present embodiment includes a high-resolution display device such as a plasma display 58, the front surface of which defines a touch surface 60. The touch surface 60 is bordered by an illuminated bezel or frame 62 coupled to the display device. Illuminated bezel 62 includes elongate side frame assemblies 64 that are coupled to the sides of the plasma display 58. Each side frame assembly 64 accommodates a generally continuous illumination source 66 (see FIG. 3) as will be described. The ends of the side frame assemblies 64 are joined by corner pieces 68 that house DSP-based CMOS digital cameras 70 (see FIG. 7). Each digital camera 70 is mounted within its respective corner piece 68 so that its field of view encompasses and looks across the entire touch surface 60.

Figure 3:
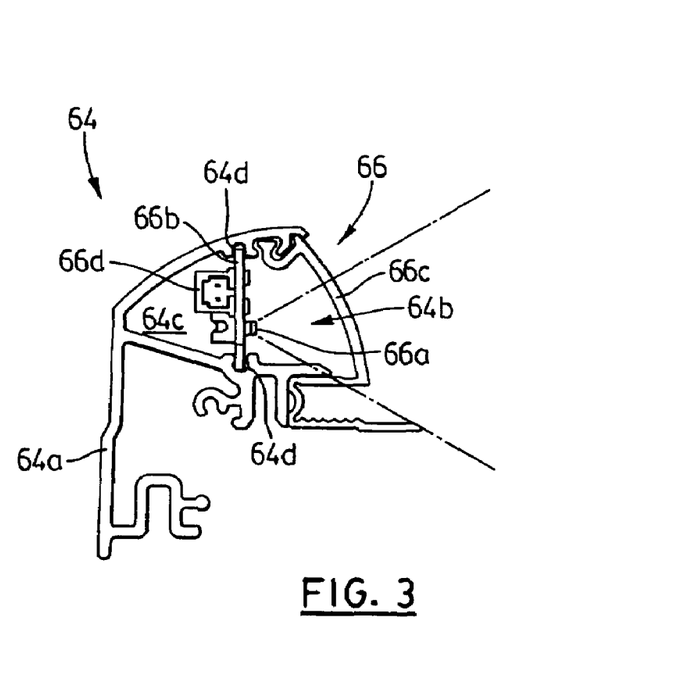
FIG. 3 is a cross-sectional view of a side fame assembly forming part of the illuminated bezel of FIG. 2.
Figure 4:
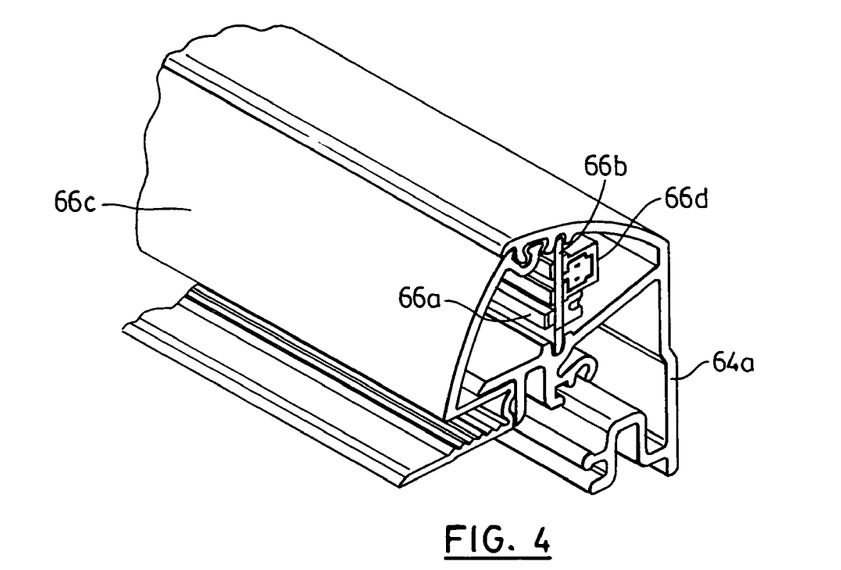
FIG. 4 is a perspective view of the side frame assembly of FIG. 3.

One of the side frame assemblies 64 is shown in FIGS. 3 and 4. As can be seen, each side frame assembly 64 includes an extrusion 64a that snaps onto a side of the plasma display 58. The extrusion 64a has an open face 64b directed towards the touch surface 60 and defines a housing 64c to accommodate the generally continuous illumination source 66.

Figure 5:
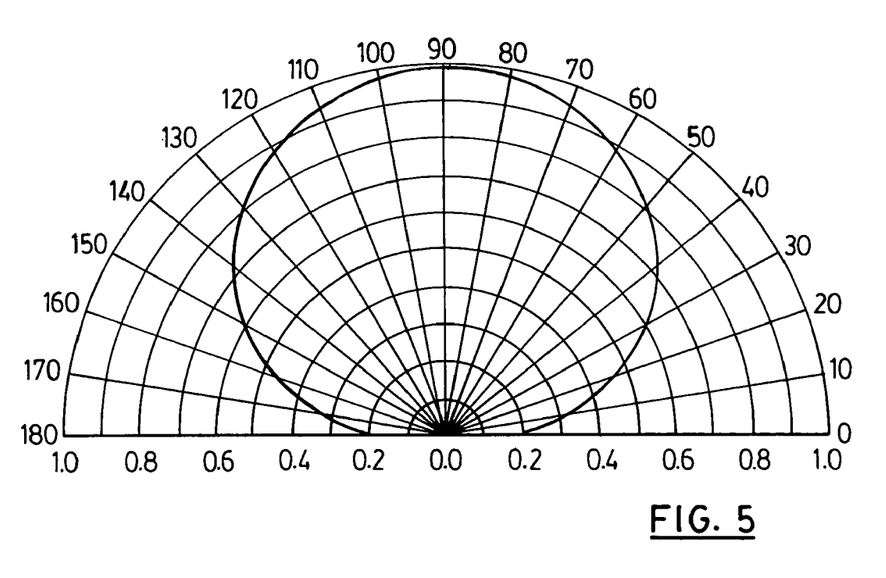
FIG. 5 shows the radiation pattern of a discrete light source forming part of the illuminated bezel of FIG. 2.

Each generally continuous illumination source 66 includes a row of discrete light sources 66a mounted on the forward surface of a printed circuit board 66b and a diffuser 66c covering the open face 64b of the extrusion 64a. The top and bottom edges of the printed circuit board 66b are received by channels 64d formed within the extrusion 64a to maintain the printed circuit board 66b in an orientation generally orthogonal to the plane of the touch surface 60. In the present embodiment, the discrete light sources 66a are in the for of infrared light emitting diodes (IR LEDs) aimed at the diffuser 66c. The spacing between each IR LED 66a is equal and is in the range of from about 1 to 2 inches. The IR LEDs 66a are oriented generally perpendicular to the plane of the diffuser 66c and are spaced from the diffuser 66c by approximately 0.8 inches. FIG. 5 shows the radiation pattern of each IR LED 66a and as can be seen, the half power field of view is approximately 120°.

The printed circuit board and IR LED arrangement is made in strips of fixed length, in this case twelve (12) inch strips. A feed through power terminal 66d is provided on the rearward side of the printed circuit board 66b and is coupled to each IR LED 66a on the strip. By providing the printed circuit board and IR LED arrangement in strips, illuminated bezels 62 for a wide variety of touch screen sizes can easily be constructed by populating the extrusions 64a with the appropriate numbers of strips and attaching power lines to the feed through terminals 66d.

Figure 6A:
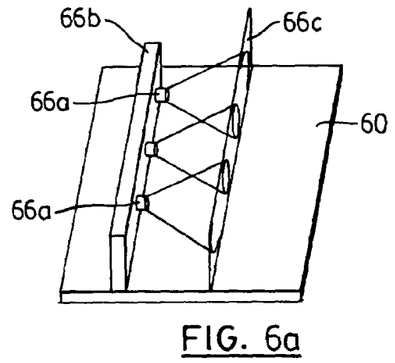
FIG. 6a is a perspective view of a portion of a continuous illumination source including a row of discrete light sources and a diffuser forming part of the illuminated bezel of FIG. 2.
Figure 6B:
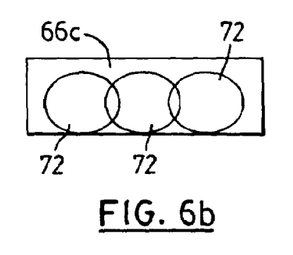
FIG. 6b is a front elevation view of the diffuser of FIG. 6a showing illumination spots projected thereon by the discrete light sources.

Each diffuser 66c is formed of plastic that is semitransparent or transparent (i.e. generally transparent) within a specified frequency range, in this case the infrared range, but substantially opaque in the visible light spectrum. As a result, the diffuser 66c obscures the internal components of the illuminated bezel 62 from view making the illuminated bezel more aesthetic. The diffuser 66c acts to diffuse or expand light emitted by the IR LEDs 66a so that the illumination sources 66 are seen by the digital cameras 70 as generally continuous illumination sources. In the present embodiment, the spacing between adjacent IR LEDs 66a, the throw of the IR LEDs 66a and the distance between the IR LEDs 66a and the diffusers 66c is such that the illumination spots 72 projected onto the diffusers 66c by the IR LEDs 66a partially overlap at the diffusers 66c and remain within the boundaries of the diffusers as shown in FIGS. 6a and 6b. The slight curved shape of the diffusers 66c results in the illumination spots 72 taking on a generally elliptical shape.

Figure 7:
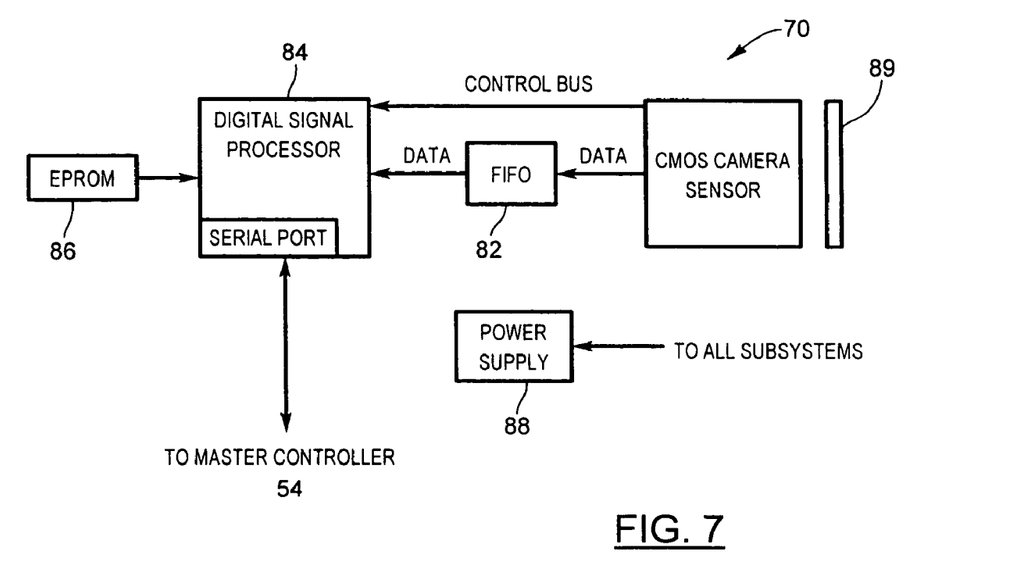
FIG. 7 is a schematic diagram of a digital camera forming part of the touch screen of FIG. 2.

One of the digital cameras 70 within a corner piece 68 is shown in FIG. 7. As can be seen, each digital camera 70 includes a two-dimensional CMOS image sensor and associated lens assembly 80, a first-in-first-out (FIFO) buffer 82 coupled to the image sensor and lens assembly 80 by a data bus and a digital signal processor (DSP) 84 coupled to the FIFO 82 by a data bus and to the image sensor and lens assembly 80 by a control bus. A boot EPROM 86 and a power supply subsystem 88 are also included. In the present embodiment, the CMOS camera image sensor is configured for a 20×640 pixel subarray that can be operated to capture image flames at rates in excess of 200 frames per second since arbitrary pixel rows can be selected. Also, since the pixel rows can be arbitrarily selected, the pixel subarray can be exposed for a greater duration for a given digital camera frame rate allowing for good operation in dark rooms as well as well lit rooms.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

An infrared pass filter 89 is provided on the digital camera image sensor and lens assembly 80 to blind the digital camera 70 to frequencies of light other than the light broadcasted by the illuminated bezel 62.

Figure 8:
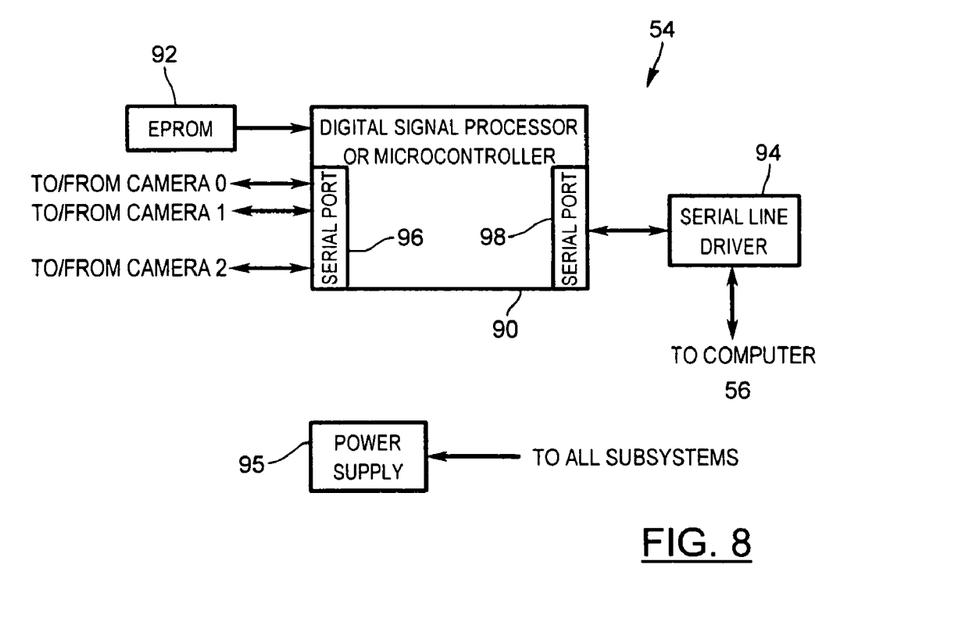
FIG. 8 is a schematic diagram of a master controller forming part of the touch system of FIG. 1.

Master controller 54 is best illustrated in FIG. 8 and includes a DSP 90, a boot EPROM 92, a serial line driver 94 and a power supply subsystem 95. The DSP 90 communicates with the DSPs 84 of the digital cameras 70 over a data bus via a serial port 96 and communicates with the computer 56 over a data bus via a serial port 98 and the serial line driver 94.

The master controller 54 and each digital camera 70 follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 70 and to the DSP 90 in the master controller 54 and the remaining two (2) channels are unused. The master controller 54 monitors the twenty-four (24) channels assigned to the DSPs 84 while the DSPs 84 monitor the six (6) channels assigned to the DSP 90 of the master controller 54. Communications between the master controller 54 and the digital cameras 70 are performed as background processes in response to interrupts.

The operation of the touch system 50 will now be described. Each digital camera 70 acquires images looking along the touch surface 60 within the field of view of its image sensor and lens assembly 80 at a desired frame rate and processes each acquired image to determine if a pointer is in the acquired image. If a pointer is in the acquired image, the image is further processed to determine characteristics of the pointer contacting or hovering above the touch surface 60. Pointer information packets (PIPs) including pointer characteristics, status and/or diagnostic information are then generated by the digital cameras 70 and ,the PIPs are queued for transmission to the master controller 54. The digital cameras 70 also receive and respond to command PIPs generated by the master controller 54.

The master controller 54 polls the digital cameras 70 for PIPs. If the PIPs include pointer characteristic information, the master controller 54 triangulates pointer characteristics in the PIPs to determine the position of the pointer relative to the touch surface 60 in Cartesian rectangular coordinates. The master controller 54 in turn transmits calculated pointer position data, status and/or diagnostic information to the computer 56. In this manner, the pointer position data transmitted to the computer 56 can be recorded as writing or drawing or can be used to control execution of application programs executed by the computer 56. The computer 56 also updates the computer-generated image output conveyed to the plasma display 58 so that information presented on the touch surface 60 reflects the pointer activity.

The master controller 54 also receives commands from the computer 56 and responds accordingly as well as generates and conveys command PIPs to the digital cameras 70. Specifics concerning the processing of acquired images and the triangulation of pointer characteristics in PIPs are described in PCT Application No. WO 02/03316 and therefore will not be described further herein.

Figure 9:
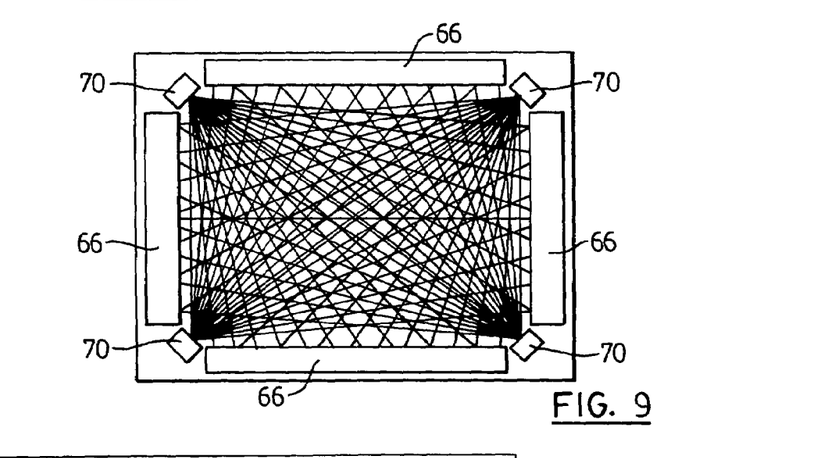
FIG. 9 is a front elevation view of the touch screen of FIG. 2 showing the illumination sources and the fields of view of the digital cameras.
Figure 10A:
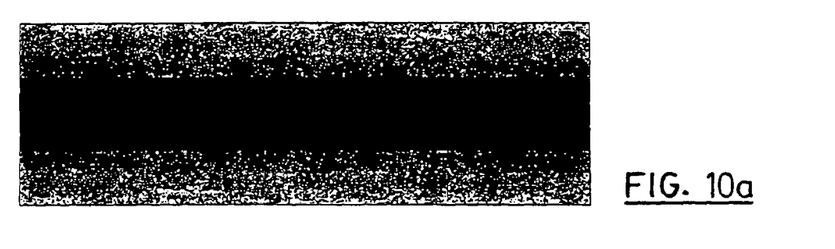
FIGS. 10a and 10b show backlight illumination projected by a continuous illumination source as seen by a digital camera with and without a diffuser.
Figure 10B:
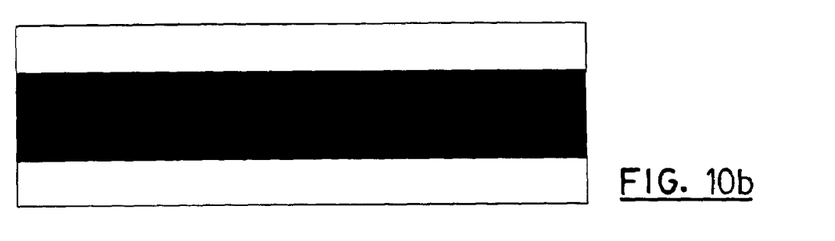

To provide adequate backlighting for the digital cameras 70, the IR LEDs 66a within each side frame assembly 64 are powered and project infrared light onto the diffusers 66c. The diffusers 66c in turn, diffuse and hence, expand the illumination spots 72 so that the intensity of light passing through the diffusers into the region encompassed by the illuminated bezel 62 is generally even across the surfaces of the diffusers 66c. As a result, the illumination sources 66 appear as generally continuous illumination sources to the digital cameras 70. Since the digital cameras 70 include infrared pass filters 89, the digital cameras 70 are effectively blind to the background and only see the infrared light broadcast by the illuminated bezel 62. This backlight illumination in conjunction with the pass filters 89 allow the digital cameras 70 to capture distinct images of a pointer in proximity to the touch surface 60 since the pointer occludes some of the backlight illumination. As a result, this helps to binarize the images captured by the digital cameras 70. FIG. 9 shows the field of views of the digital cameras 70 and as can be seen in this arrangement each digital camera 70 receives backlight illumination directly from two illumination sources 66. FIG. 10a shows a continuous illumination source of backlight illumination as seen by one of the digital cameras 70. For contrast, FIG. 10b shows the continuous illumination source of backlight illumination as seen be one of the digital cameras 70 with the diffuser 66c removed.

Figure 11A:
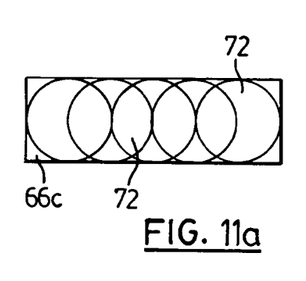
FIGS. 11a to 11c are front elevation views of a diffuser showing illumination spots projected thereon at different discrete light source spacings.
Figure 11B:
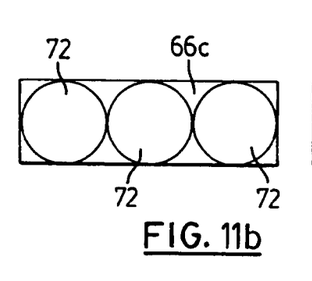
Figure 11C:
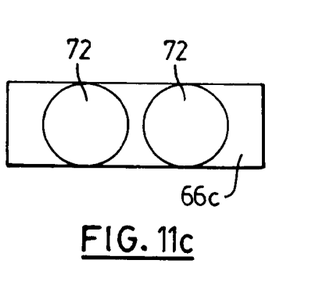

In the preferred embodiment, the spacing between the IR LEDs 66a is such that the illumination spots 72 projected onto the diffusers 66c partially overlap as shown in FIGS. 6a and 6b. The optical properties of the diffusers 66c are such that the diffusers 66c expand the illumination spots 72 so that light passing through the diffusers has a generally even intensity over the entire surfaces of the diffusers 66c. As will be appreciated, alternative arrangements are possible. The IR LEDs 66a can be spaced so that the illumination spots 72 projected onto the diffusers 64a significantly overlap as shown in FIG. 11a, abut as shown in FIG. 11b or are spaced apart as shown in FIG. 11c. In the case where the illumination spots 72 are spaced apart, if the optical properties of the diffusers 66c are such that the illumination spots 72 cannot be adequately expanded, the digital cameras 70 will see the illumination sources 66 as being discontinuous or discrete.

Figure 12:
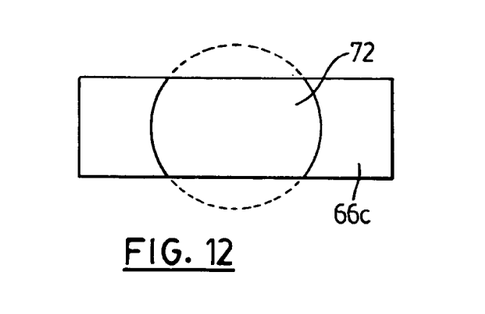
FIG. 12 is a front elevation view of a diffuser showing an illumination spot projected thereon at an increased discrete light source throw.

Although a particular IR LED throw, distance between the IR LEDs 66a and diffusers 66c, and angular orientation of the IR LEDs 66a with respect to the diffusers 66c have been disclosed, those of skill in the art will appreciate that the IR LED throw, distance between the IR LEDs 66a and the diffusers 66c, and the angular orientation of the IR LEDs 66a with respect to the diffusers 66c may be altered to suit the particular environment. An increase in IR LED throw or distance between the IR LEDs 66a and the diffusers 66c will result in expanded illumination spots 72 projected onto the diffusers 66c as shown in FIG. 12.

Figure 13A:
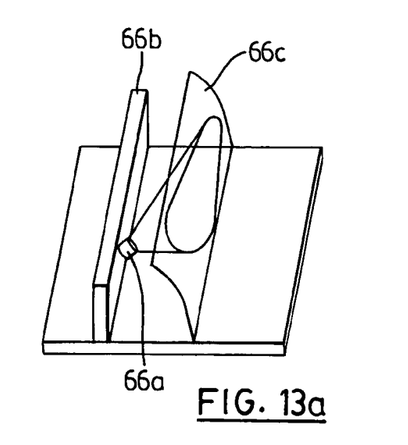
FIG. 13a is a perspective view showing an alternative discrete light source orientation for an illumination source.
Figure 13B:
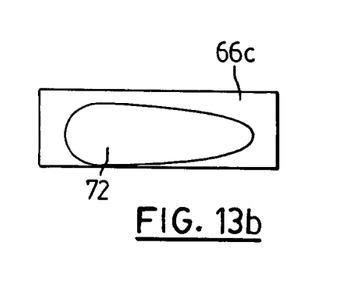
Figure 14A:
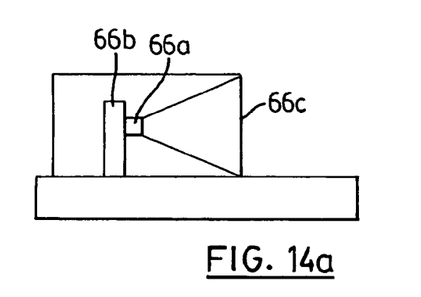
FIG. 14a is a side elevation view showing an alternative diffuser profile for an illumination source.
Figure 14B:
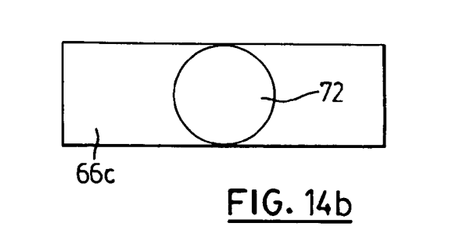
FIG. 14b is a front elevation view of the diffuser of FIG. 14a showing an illumination spot projected thereon by a discrete light source.

Changes in the angular orientation of the IR LEDs 66a with respect to the diffusers 66c determines the geometry of the illumination spots 72 as shown in FIGS. 13a and 13b. In this example, the angular orientation of the IR LED 66a results in an elongate illumination spot being projected onto the diffuser 66c. The profile geometry of the diffusers 66c will also alter the profiles of the illumination spots 72 as shown in FIGS. 14a and 14b. In this example, the diffuser profile geometry results in circular illumination spots being projected onto the diffuser 66c rather than elliptical illumination spots as shown in FIGS. 6a and 6b.

Figure 15:
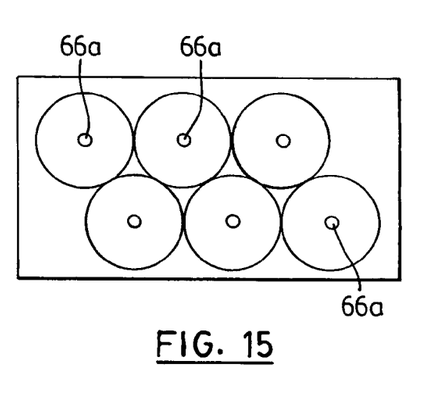
FIGS. 15a and 15b are front elevation views of alternative discrete light source arrangements for an illumination source.
Figure 15A:
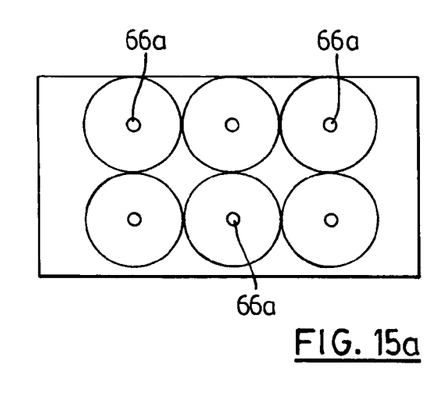

Although the IR LEDs 66a have been described as being equally spaced along the lengths of the printed circuit boards 66b, those of skill in the art will appreciate that the spacing between the IR LEDs need not be equal along the lengths of the printed circuit boards: For example, the spacing between the IR LEDs 66a may be non-linear and correspond to the resolution of the digital cameras 70. In addition, although each illumination source 66 is described as including a single row of IR LEDs 66a, it will be appreciated by those of skill in the art that an array of IR LEDs 66a including stacked rows or other two-dimensional arrays of IR LEDs may be provided in each illumination source 66 to enhance the backlight illumination provided to the digital cameras 70. In the stacked row IR LED arrangement, the rows of IR LEDs 66a can be aligned as shown in FIG. 15a or staggered as shown in FIG. 15b.

Although the diffusers 66c are described as being formed of plastic that is generally transparent in the IR range and generally opaque in the visible range, those of skill in the art will appreciate that the diffusers 66c may be formed of other suitable materials and/or have alternative optical properties. For example, the diffusers 66c may be formed of a polymer impregnated with a suitable material to aid in light diffusion. Furthermore, the diffusers may also be designed to act as polarizers to polarize the light emitted by the illumination sources 66. The diffusers 66c can also be modified to control the backlight illumination as seen by the digital cameras 70. For example, the diffusers 66c may be provided with horizontal slits therein defining apertures to limit the vertical backlight illumination as seen by the digital cameras. In this case, backlight illumination projected by the illumination sources 66 is effectively cropped to remove top and bottom fringe effects thereby to provide a more continuous source of backlight illumination.

Rather than using discrete light sources, continuous light sources in conjunction with colour filters incorporated into the diffusers or in close proximity thereto to block unwanted frequencies can be used to provide the desired backlight illumination for the digital cameras 70. For example, the IR LEDs 66a can be replaced with electroluminescent wire extending around the illuminated bezel 62 within the side frame assemblies 64. As is known, electroluminescent wire when powered casts continuous light in the visible range in one of eight frequencies. Of course other continuous sources of IR illumination can be used. As will be appreciated, when non-infrared light sources are used in the illumination sources 62, the filters 89 of the digital cameras 70 are selected to pass the appropriate frequencies of light broadcast by the illuminated bezel 62 and blind the digital cameras 70 to the background.

Although the touch system 50 has been described as including a plasma display 58 to present images on the touch surface 60, those of skill in the art will appreciate that this is not required. The touch screen 52 may be a rear or front projection display device or virtually any surface on which a computer generated image is projected. Alternatively, the touch system 50 may be a writeboard where images are not projected thereon.

Also, although the touch system 50 is described as including a master controller 54 separate from the digital cameras 70, if desired one of the digital cameras 70 can be conditioned to function as both a camera and the master controller and poll the other digital cameras for PIPs. In this case, it is preferred that the digital camera functioning as the master controller includes a faster DSP 84 than the remaining digital cameras.

Furthermore, although the touch system 50 has been described as including four digital cameras 70, each mounted adjacent a corner of the illuminated bezel 62, those of skill in the art will appreciate that other image sensing arrangements can be used. The touch system 50 may include basically any number of optical sensors to acquire images along the touch surface 60 and one or more illumination sources 66 to provide the desired backlight illumination.

Although preferred embodiments of the present invention have been described, those of skill in the art will appreciate that variations and modifications may be made without departing from the spirit and scope thereof as defined by the appended claims.

What is claimed is:

1. In a touch system including a touch surface and at least one optical sensor looking along the touch surface to acquire images of a pointer in proximity thereto, an illumination source to provide backlighting to said at least one optical sensor comprising:

at least one light source; and a diffuser disposed between said at least one light source and said at least one optical sensor, said diffuser diffusing light projected by said at least one light source prior to said light being directed across the touch surface to said at least one optical sensor.

2. An illumination source according to claim 1 wherein said at least one light source is at least one discrete light source.

3. An illumination source according to claim 2 wherein said at least one light source includes a plurality of spaced discrete light sources.

4. An illumination source according to claim 3 wherein said discrete light sources are arranged in at least one row.

5. An illumination source according to claim 4 wherein said discrete light sources are arranged in a two-dimensional array.

6. An illumination source according to claim 5 wherein said two-dimensional array includes a plurality of stacked rows of discrete light sources.

7. An illumination source according to claim 3 wherein said discrete light sources are generally equally spaced.

8. An illumination source according to claim 3 wherein the spacing between said discrete light sources is non-linear.

9. An illumination source according to claim 3 wherein said discrete light sources are spaced such that the light projected onto the diffuser by adjacent discrete light sources overlaps.

10. An illumination source according to claim 9 wherein said spacing is such that the light projected onto the diffuser by adjacent discrete light sources significantly overlaps.

11. An illumination source according to claim 3 wherein said discrete light sources are spaced such that the light projected onto the diffuser by adjacent discrete light sources abuts.

12. An illumination source according to claim 3 wherein said discrete light sources are spaced such that the light projected onto the diffuser by adjacent discrete light sources is spaced apart.

13. An illumination source according to claim 3 wherein said diffuser diffuses the light projected by said discrete light sources so that the light directed to said at least one optical sensor is generally continuous across said illumination source.

14. An illumination source according to claim 3 wherein said diffuser is generally transparent in a specified frequency range.

15. An illumination source according to claim 14 wherein said diffuser is generally opaque in a different specified frequency range.

16. An illumination source according to claim 15 wherein said discrete light sources are infrared light emitting diodes (IR LEDs) and wherein said diffuser is generally transparent in the infrared range.

17. An illumination source according to claim 16 wherein said diffuser is generally opaque in the visible light spectrum.

18. An illumination source according to claim 3 wherein said diffuser further polarizes the light prior to being directed to said at least one optical sensor.

19. An illumination source according to claim 1 wherein said at least one light source is a continuous light source.

20. An illumination source according to claim 19 wherein said continuous light source projects light in the infrared spectrum.

21. An illumination source according to claim 19 wherein said continuous light source projects light in the visible spectrum and wherein said illumination source further includes a color filter through which said light passes.

22. An illumination source according to claim 21 wherein said color filter is adjacent to said diffuser.

23. An illumination source according to claim 21 wherein said diffuser acts as said color filter.

24. A touch system comprising:
at least one optical sensor associated with a touch surface and having a field of view encompassing and looking across at least a portion of said touch surface;
at least one source of backlight illumination directing light into the field of view of said at least one optical sensor, said at least one illumination source including at least one light source and a diffusion medium to expand light projected by said at least one light source prior to said light being directed into said field of view; and
a pass filter associated with said at least one optical sensor to pass the light directed by said source of backlight illumination to said at least one optical sensor.

25. A touch system according to claim 24 wherein said source of backlight illumination extends at least partially along one side of said touch surface opposite said at least one optical sensor.

26. A touch system according to claim 25 wherein said source of backlight illumination extends generally the length of said one side.

27. A touch system according to claim 26 wherein said source of backlight illumination includes a plurality of spaced discrete light sources.

28. A touch system according to claim 27 wherein said discrete light sources are spaced such that the light projected onto the diffusion medium by adjacent discrete light sources overlaps.

29. A touch system according to claim 28 wherein said diffusion medium expands the light projected by said discrete light sources so that the light directed to said at least one optical sensor is generally continuous across said at least one source of backlight illumination.

30. A touch system according to claim 29 wherein said diffusion medium is generally transparent in a specified frequency range.

31. A touch system according to claim 30 wherein said diffusion medium is generally opaque in a different specified frequency range.

32. A touch system according to claim 31 wherein said discrete light sources are infrared light emitting diodes (IR LEDs) and wherein said diffusion medium is generally transparent in the infrared range, said pass filter being an infrared pass filter.

33. A touch system according to claim 32 wherein said diffusion medium is generally opaque in the visible light spectrum.

34. A touch system according to claim 27 wherein said diffusion medium further polarizes the light being directed to said at least one optical sensor.

35. A touch system according to claim 24 wherein said at least one light source is a continuous light source.

36. A touch system according to claim 35 wherein said continuous light source projects light in the visible spectrum and wherein said source of backlight illumination further includes a color filter through which said backlight illumination passes.

37. An illumination source according to claim 36 wherein said color filter is adjacent to said diffusion medium.

38. An illumination source according to claim 37 wherein said diffusion medium acts as said color filter.

39. A touch system according to claim 35 wherein said continuous light source projects light in the infrared spectrum.

40. A touch system according to claim 26 including a plurality of optical sensors adjacent corners of said touch surface and a plurality of sources of backlight illumination extending along sides of said touch surface.

41. A passive touch system comprising:
a touch surface;
at least one source of backlight illumination projecting backlighting across said touch surface;
at least two image sensors associated with said touch surface, said at least two image sensors acquiring images of said touch surface from different locations and having overlapping fields of view;
a pass filter associated with each of said image sensors generally to blind said image sensors except to said projected backlighting;
a digital signal processor associated with each image sensor, the digital signal processors associated with said at least two image sensors selecting pixel subsets of images acquired by said at least two image sensors and processing pixel data acquired by the selected pixel subsets to generate pointer characteristic data when a pointer exists in said acquired images; and
a master digital signal processor in communication with said digital signal processors, said master digital signal processor receiving pointer characteristic data from said digital signal processors and triangulating the pointer characteristic data to determine the location of said pointer relative to said touch surface.

42. A passive touch system according to claim 41 including a plurality of sources of backlight illumination.

43. A passive touch system according to claim 42 wherein each source of backlight illumination extends along a different side of said touch surface.

44. A passive touch system according to claim 43 wherein said sources of backlight illumination project light directly into the fields of view of said at least two image sensors.

45. A passive touch system according to claim 44 wherein said sources of backlight illumination appear as continuous light sources to said at least two image sensors.

46. A passive touch system according to claim 45 including an image sensor at each corner of said touch surface and a source of backlight illumination along each side of said touch surface.

47. A touch system comprising:
at least two CMOS image sensors associated with a touch surface, said at least two CMOS image sensors acquiring images of said touch surface from different locations and having overlapping fields of view;

at least one source of backlight illumination projecting backlighting across said touch surface through a diffuser;

a pass filter associated with each of said image sensors generally to blind said image sensors except to said projected backlighting; and at least one processor receiving and processing image data acquired by said at least two CMOS image sensors to detect the existence of a pointer in said images and to determine the location of said pointer relative to said touch surface.

48. A touch system according to claim 47 including a plurality of sources of backlight illumination.

49. A touch system according to claim 48 wherein each source of backlight illumination extends along a different side of said touch surface.

50. A touch system according to claim 49 wherein said sources of backlight illumination project light directly into the fields of view of said at least two image sensors.

51. A touch system according to claim 50 wherein said sources of backlight illumination appear as continuous light sources to said at least two CMOS image sensors.

52. A touch system according to claim 51 include a CMOS image sensor at each corner of said touch surface and a source of backlight illumination along each side of said touch surface.

53. A touch system comprising:

at least two optical recording devices associated with a touch surface, said at least two optical recording devices acquiring images of said touch surface from different locations and having overlapping fields of view;

at least one source of backlight illumination projecting backlighting across said touch surface;

a pass filter associated with said optical recording devices generally to blind said optical recording devices except to said projected backlighting; and a processor receiving and processing image data acquired by said at least two optical recording devices to detect the existence of a pointer in said images and to determine the location of said pointer relative to said touch surface, wherein said processor includes first and second processing stages, said first processing stage including a plurality of digital signal processors each associated with a respective one of said optical recording devices, said digital signal processors processing pixel data from pixel subsets of said optical recording devices and generating pointer parameter data, said second processing stage processing said pointer parameter data from said first processing stage to determine the location of the pointer.

54. A touch system according to claim 53 wherein said second processing stage includes a master digital signal processor receiving said pointer parameter data from said digital signal processors, said master digital signal processor triangulating said pointer parameter data.

55. A touch system according to claim 53, wherein a third processing stage includes a personal computer receiving the location of said pointer relative to said touch surface from said master digital signal processor.

56. A touch system according to claim 53 including a plurality of sources of backlight illumination.

57. A touch system according to claim 56 wherein each source of backlight illumination extends along a different side of said touch surface.

58. A touch system according to claim 57 wherein said sources of backlight illumination project light directly into the fields of view of said at least two optical recording devices.

59. A touch system according to claim 58 wherein said sources of backlight illumination appear as continuous light sources to said at least two optical recording devices.

60. A touch system according to claim 59 including an optical recording device at each corner of said touch surface and a source of backlight illumination along each side of said touch surface.

61. An imaging assembly comprising:

a substantially rectangular bezel to surround a display surface;

at least one optical sensor mounted on said bezel, said at least one optical sensor being oriented to have a field of view looking along said display surface;

at least one source of backlight illumination within said bezel projecting backlight illumination through a diffuser into said field of view; and a pass filter associated with said at least one optical sensor to pass the light directed by said source of backlight illumination to said at least one optical sensor.

62. An imaging assembly according to claim 61 include an optical sensor at each corner of said bezel and a source of backlight illumination within each side of said bezel.

63. An imaging assembly according to claim 62 wherein said sources of backlight illumination appear as continuous light sources to said optical sensors.

64. An imaging assembly according to claim 63 wherein said bezel includes side frame assemblies joined by corner pieces, said side frame assemblies including housing elements engaging said display surface and accommodating said sources of backlight illumination and said corner pieces accommodating said optical sensors.

65. An imaging assembly according to claim 63 wherein each optical sensor is a CMOS digital camera.

66. An imaging assembly according to claim 65, wherein each CMOS digital camera has a selectable pixel array.

67. An imaging assembly according to claim 64 wherein each source of backlight illumination includes a plurality of spaced discrete light sources.

68. An imaging assembly according to claim 63 wherein each source of backlight illumination includes a continuous light source.

69. A method of detecting the position of a pointer relative to a touch surface comprising the steps of:

acquiring multiple images of a pointer relative to said touch surface;

selecting pixel subsets of said acquired images;

processing pixel data acquired by the pixel subsets to detect the existence of said pointer therein and to determine the location of the pointer relative to the touch surface using triangulation; and during said acquiring providing backlight illumination across said touch surface and acquiring said images based on said backlight illumination.

* * * * *